United States Patent
Beukema et al.

(10) Patent No.: US 7,113,995 B1
(45) Date of Patent: Sep. 26, 2006

(54) METHOD AND APPARATUS FOR REPORTING UNAUTHORIZED ATTEMPTS TO ACCESS NODES IN A NETWORK COMPUTING SYSTEM

(75) Inventors: Bruce Leroy Beukema, Hayfield, MN (US); Danny Marvin Neal, Round Rock, TX (US); Gregory Francis Pfister, Austin, TX (US); Renato John Recio, Austin, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 969 days.

(21) Appl. No.: 09/692,348

(22) Filed: Oct. 19, 2000

(51) Int. Cl.
*G06F 15/16* (2006.01)
(52) U.S. Cl. .................... 709/229; 380/200
(58) Field of Classification Search .......... 713/201, 713/162, 185; 709/222, 220, 229
See application file for complete search history.

(56) References Cited

U.S. PATENT DOCUMENTS

| | | | |
|---|---|---|---|
| 4,638,356 A * | 1/1987 | Frezza | 380/200 |
| 4,814,984 A | 3/1989 | Thompson | 364/200 |
| 4,939,752 A | 7/1990 | Literati et al. | 375/107 |
| 4,951,225 A | 8/1990 | Lee et al. | 364/513 |
| 4,975,829 A | 12/1990 | Clarey et al. | 364/200 |
| 5,043,981 A | 8/1991 | Firoozmand et al. | 370/85.1 |
| 5,185,736 A | 2/1993 | Tyrrell et al. | 370/55 |
| 5,185,741 A | 2/1993 | Iguchi et al. | 370/110.1 |
| 5,218,680 A | 6/1993 | Farrell et al. | 395/325 |
| 5,402,416 A | 3/1995 | Cieslak et al. | 370/60 |
| 5,461,608 A | 10/1995 | Yoshiyama | 370/16.1 |
| 5,513,368 A | 4/1996 | Garcia, Jr. et al. | 395/842 |
| 5,551,066 A | 8/1996 | Stillman et al. | 455/69 |
| 5,610,980 A | 3/1997 | Johnson et al. | 380/4 |
| 5,617,424 A | 4/1997 | Murayama et al. | 370/389 |
| 5,617,537 A | 4/1997 | Yamada et al. | 395/200.01 |
| 5,719,938 A * | 2/1998 | Haas et al. | 705/52 |
| 5,729,686 A | 3/1998 | Heck et al. | 395/200.38 |
| 5,758,083 A | 5/1998 | Singh et al. | 395/200.53 |
| 5,778,176 A * | 7/1998 | Geihs et al. | 709/227 |
| 5,793,968 A | 8/1998 | Gregerson et al. | 395/200.39 |
| 5,805,072 A | 9/1998 | Kakemizu | 340/825.03 |
| 5,884,036 A | 3/1999 | Haley | 395/200.54 |
| 5,907,689 A | 5/1999 | Tavallaei et al. | 395/290 |
| 5,951,683 A | 9/1999 | Yuuki et al. | 713/1 |
| 6,032,191 A | 2/2000 | Chowdhury et al. | 709/238 |
| 6,081,752 A | 6/2000 | Benson, IV et al. | 700/79 |
| 6,085,238 A | 7/2000 | Yuasa et al. | 709/223 |
| 6,092,214 A | 7/2000 | Quoc et al. | 714/4 |
| 6,098,098 A | 8/2000 | Sandahl et al. | 709/221 |

(Continued)

*Primary Examiner*—Bunjob Jaroenchonwanit
*Assistant Examiner*—Kyung Hye Shin
(74) *Attorney, Agent, or Firm*—Duke W. Yee; Thomas E. Tyson; Wayne P. Bailey

(57) ABSTRACT

A method in a node for managing authorized attempts to access the node. A packet is received from a source, wherein the packet includes a first key. A determination is made as to whether the first key matches a second key for the node. The packet is dropped without a response to the source if the first key does not match the second key. Information from the packet is stored in response to this absence of a match. The information is sent to a selected recipient in response to a selected event, which may be, for example, either immediately or in response to polling to see if the information is present.

25 Claims, 5 Drawing Sheets

U.S. PATENT DOCUMENTS

| | | | |
|---|---|---|---|
| 6,108,739 A | 8/2000 | James et al. | 710/113 |
| 6,115,776 A | 9/2000 | Reid et al. | 710/260 |
| 6,128,738 A * | 10/2000 | Doyle et al. | 713/185 |
| 6,192,397 B1 | 2/2001 | Thompson | 709/209 |
| 6,199,133 B1 | 3/2001 | Schnell | 710/110 |
| 6,222,822 B1 | 4/2001 | Gerardin et al. | 370/230 |
| 6,269,396 B1 | 7/2001 | Shah et al. | 709/223 |
| 6,298,376 B1 | 10/2001 | Rosner et al. | 709/209 |
| 6,304,973 B1 * | 10/2001 | Williams | 713/201 |
| 6,311,321 B1 | 10/2001 | Agnihotri et al. | 717/1 |
| 6,330,555 B1 | 12/2001 | Weber | 707/2 |
| 6,341,322 B1 | 1/2002 | Liu et al. | 710/129 |
| 6,343,320 B1 | 1/2002 | Fairchild et al. | 709/224 |
| 6,363,411 B1 | 3/2002 | Dugan et al. | 709/202 |
| 6,363,416 B1 | 3/2002 | Naeimi et al. | 709/209 |
| 6,363,495 B1 * | 3/2002 | MacKenzie et al. | 714/4 |
| 6,389,432 B1 | 5/2002 | Pothapragada et al. | 707/205 |
| 6,421,779 B1 | 7/2002 | Kuroda et al. | 713/169 |
| 6,434,113 B1 | 8/2002 | Gubbi | 370/216 |
| 6,449,641 B1 * | 9/2002 | Moiin et al. | 709/220 |
| 6,470,397 B1 | 10/2002 | Shah et al. | 709/250 |
| 6,496,503 B1 | 12/2002 | Pelissier et al. | 370/389 |
| 6,507,592 B1 | 1/2003 | Hurvig et al. | 370/503 |
| 6,529,286 B1 | 3/2003 | King | 358/1.14 |
| 6,532,494 B1 * | 3/2003 | Frank et al. | 709/224 |
| 6,597,956 B1 | 7/2003 | Aziz et al. | 700/3 |
| 6,636,520 B1 | 10/2003 | Jason et al. | 370/401 |
| 6,654,363 B1 | 11/2003 | Li et al. | 370/338 |
| 6,658,417 B1 | 12/2003 | Stakutis et al. | 707/10 |
| 6,664,978 B1 * | 12/2003 | Kekic et al. | 715/733 |
| 6,665,714 B1 | 12/2003 | Blumenau et al. | 709/222 |
| 6,674,911 B1 | 1/2004 | Pearlman et al. | 382/240 |
| 6,694,361 B1 | 2/2004 | Shah et al. | 709/222 |
| 6,708,272 B1 * | 3/2004 | McCown et al. | 713/151 |
| 2002/0021307 A1 | 2/2002 | Glenn et al. | 345/753 |
| 2002/0026517 A1 | 2/2002 | Watson, Jr. | 709/228 |
| 2002/0073257 A1 | 6/2002 | Beukema et al. | 710/105 |
| 2002/0133620 A1 | 9/2002 | Krause | 709/238 |
| 2003/0018787 A1 | 1/2003 | Neal et al. | 709/227 |
| 2003/0046505 A1 | 3/2003 | Craddock et al. | 711/165 |
| 2004/0057424 A1 | 3/2004 | Kokkonen | 370/352 |

\* cited by examiner

METHOD AND APPARATUS FOR REPORTING UNAUTHORIZED ATTEMPTS TO ACCESS NODES IN A NETWORK COMPUTING SYSTEM

CROSS REFERENCES TO RELATED APPLICATIONS

The present invention is related to applications entitled A System Area Network of End-to-End Context via Reliable Datagram Domains, Ser. No. 09/692,354, Method and Apparatus for Pausing a Send Queue without Causing Sympathy Errors, Ser. No. 09/692,340, Method and Apparatus to Perform Fabric Management, Ser. No. 09/692,344, End Node Partitioning using LMC for a System Area Network, Ser. No. 09/692,351; Method and Apparatus for Dynamic Retention of System Area Network Management Information in Non-Volatile Store, Ser. No. 09/692,365, Method and Apparatus for Retaining Network Security Settings Across Power Cycles, Ser. No. 09/692,337, Method and Apparatus for Reliably Choosing a Master Network Manager During Initialization of a Network Computing System, Ser. No. 09/692,346, Method and Apparatus for Ensuring Scalable Mastership During Initialization of a System Area Network, Ser. No. 09/692,341, and Method and Apparatus for Using a Service ID for the Equivalent of Port ID in a Network Computing System, Ser. No. 09/692,352, all of which are filed even date hereof, assigned to the same assignee, and incorporated herein by reference.

BACKGROUND OF THE INVENTION

1. Technical Field

The present invention relates generally to an improved network computing system, and in particular to a method and apparatus for managing a network computing system. Still more particularly, the present invention provides a method and apparatus for handling unauthorized attempts to access nodes within a network computing system.

2. Description of Related Art

In a System Area Network (SAN), the hardware provides a message passing mechanism which can be used for Input/Output devices (I/O) and interprocess communications between general computing nodes (IPC). Processes executing on devices access SAN message passing hardware by posting send/receive messages to send/receive work queues on a SAN channel adapter (CA). These processes also are referred to as "consumers". The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (RawD). Consumers retrieve the results of these messages from a completion queue (CQ) through SAN send and receive work completions (WC). The source channel adapter takes care of segmenting outbound messages and sending them to the destination. The destination channel adapter takes care of reassembling inbound messages and placing them in the memory space designated by the destination's consumer. Two channel adapter types are present, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

A SAN network provides an ability to partition the use of various components within the network. Some devices may be private to certain nodes, while others are shared between many nodes within the network. In some cases, a node may try to access other nodes without authorization. In other cases, the access may be a malicious attempt by a node to access nodes within the network outside the domain of access for that given node. It would be advantageous to have an improved method and apparatus for handling unauthorized attempts to access a node.

SUMMARY OF THE INVENTION

The present invention provides a method in a node for managing authorized attempts to access the node. A packet is received from a source, wherein the packet includes a first key. A determination is made as to whether the first key matches a second key for the node. The packet is dropped without a response to the source if the first key does not match the second key. Information from the packet is stored in response to this absence of a match. The information is sent to a selected recipient in response to a selected event, which may be, for example, either immediately or in response to polling to see if the information is present.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a network computing system having end nodes, switches, routers, and links interconnecting these components. Each end node uses send and receive queue pairs to transmit and receives messages. The end nodes segment the message into packets and transmit the packets over the links. The switches and routers interconnects the end nodes and route the packets to the appropriate end node. The end nodes reassemble the packets into a message at the destination.

Figure 1:
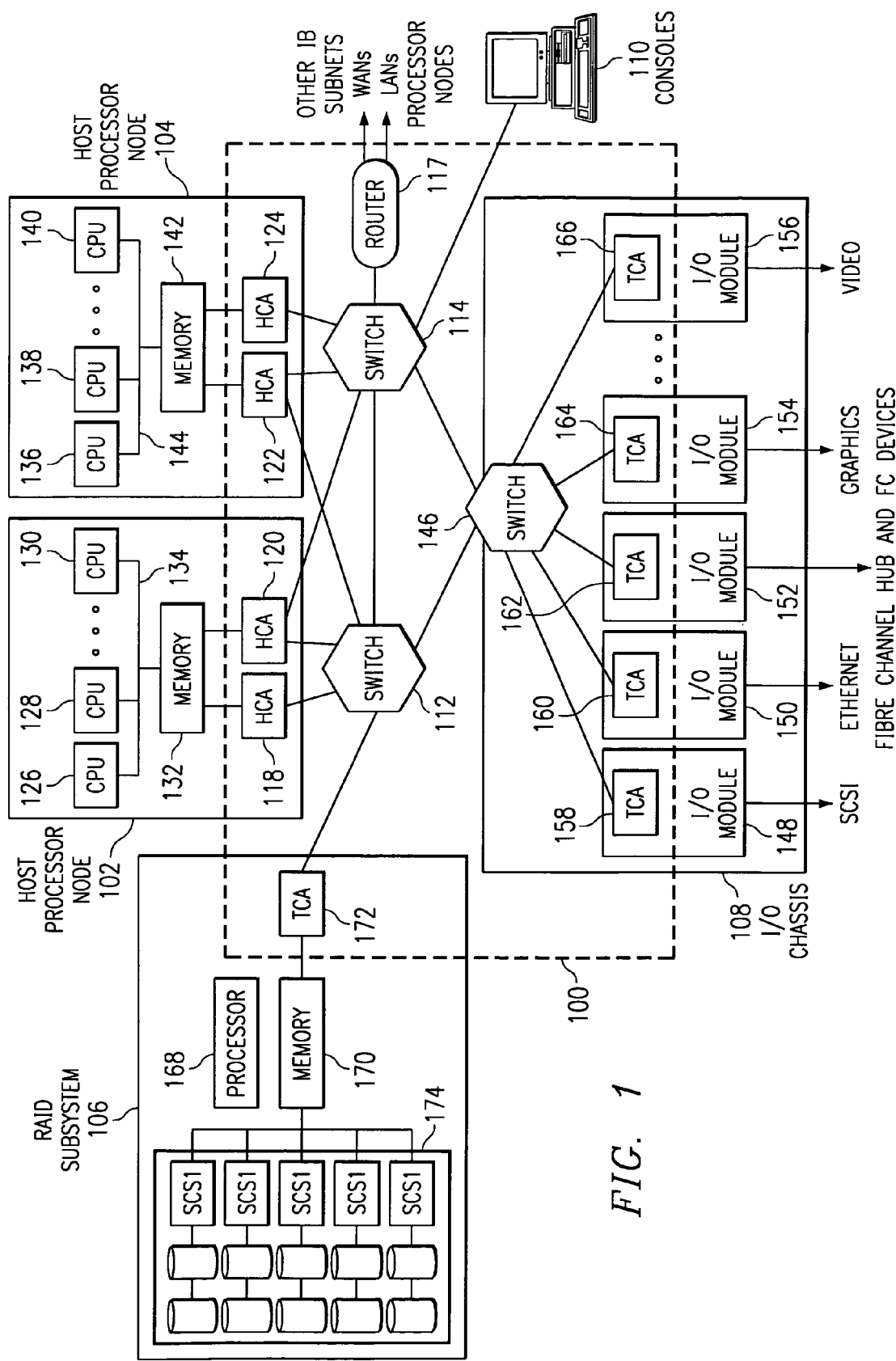
FIG. 1 is a diagram of a network computing system is illustrated in accordance with a preferred embodiment of the present invention.

With reference now to the figures and in particular with reference to FIG. 1, a diagram of a network computing system is illustrated in accordance with a preferred embodiment of the present invention. The network computing system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the network computing system. A node is any component attached to one or more links of a network. In the depicted example, SAN 100 includes nodes in the form of host processor node 102, host processor node 104, redundant array independent disk (RAID) subsystem node 106, switch node 112, switch node 114, router node 117, and I/O chassis node 108. The nodes illustrated in FIG. 1 are for illustrative purposes only, as SAN 100 can connect any number and any type of independent processor nodes, and I/O adapter nodes. Any one of the nodes can function as an end node, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in network computing system, such as SAN 100.

A message, as used herein, is an application-defined unit of data exchange, which is a primitive unit of communication between cooperating processes. A packet is one unit of data encapsulated by a networking protocol headers and/or trailer. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a network computing system. The SAN 100 shown in FIG. 1 includes a switched communications fabric, which allows many devices to concurrently transfer data with high-bandwidth and low latency in a secure, remotely managed environment. End nodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgment packets. Switches and routers pass packets along, from the source to the destination. Except for the variant CRC trailer field which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, RAID I/O subsystem 106, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the network computing system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers.

The I/O chassis 108 in FIG. 1 includes a switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in network computing system. With an I/O adapter attached to the SAN 100, the resulting I/O adapter node has substantially the same communication capability as any host processor node in SAN 100.

Figure 2:
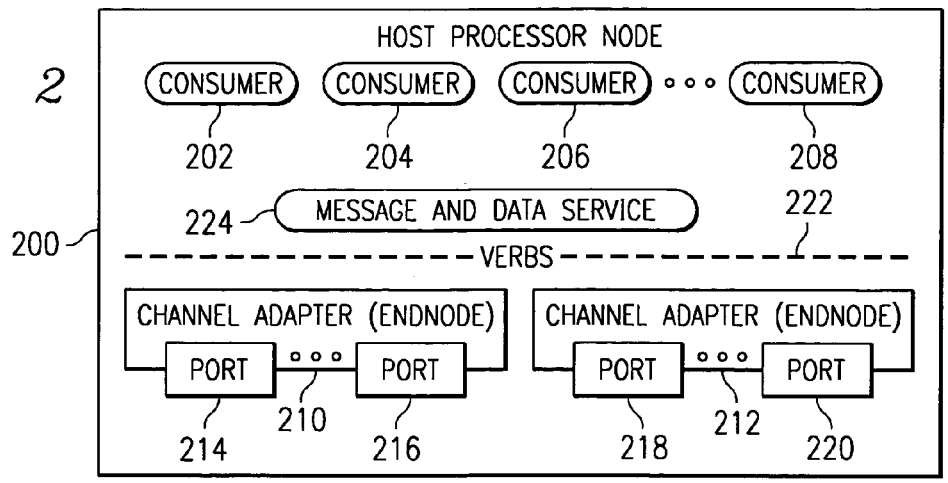
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200, shown in FIG. 2, includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher level interface than the verb layer and is used to process messages and data received through channel adapter 210 and channel adapter 212.

Figure 3:
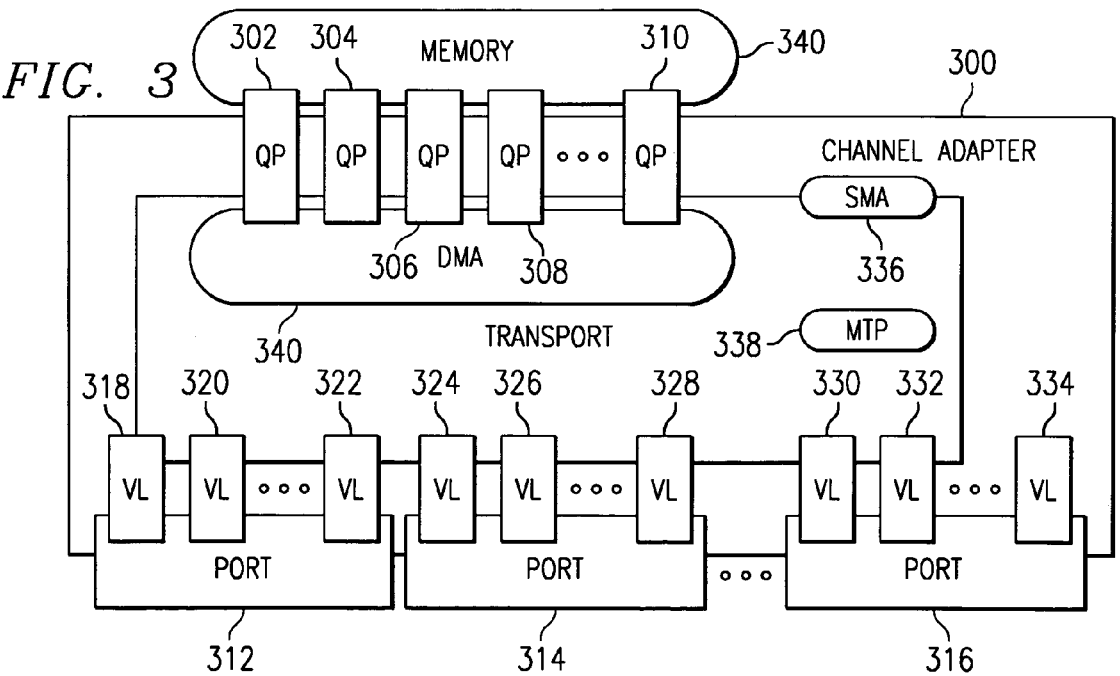
FIG. 3 is a diagram of a host channel adapter in accordance with a preferred embodiment of the present invention.

With reference now to FIG. 3, a diagram of a host channel adapter is depicted in accordance with a preferred embodiment of the present invention. Host channel adapter 300 shown in FIG. 3 includes a set of queue pairs (QPs) 302–310, which are used to transfer messages to the host channel adapter ports 312–316. Buffering of data to host channel adapter ports 312–316 is channeled through virtual lanes (VL) 318–334 where each VL has its own flow control. Subnet manager configures channel adapters with the local addresses for each physical port, i.e., the port's LID.

Subnet manager agent (SMA) 336 is the entity that communicates with the subnet manager for the purpose of configuring the channel adapter. Memory translation and protection (MTP) 338 is a mechanism that translates virtual addresses to physical addresses and to validate access rights. Direct memory access (DMA) 340 provides for direct memory access operations using memory 340 with respect to queue pairs 302–310.

A single channel adapter, such as the host channel adapter 300 shown in FIG. 3, can support thousands of queue pairs. By contrast, a target channel adapter in an I/O adapter typically supports a much smaller number of queue pairs.

Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 4:
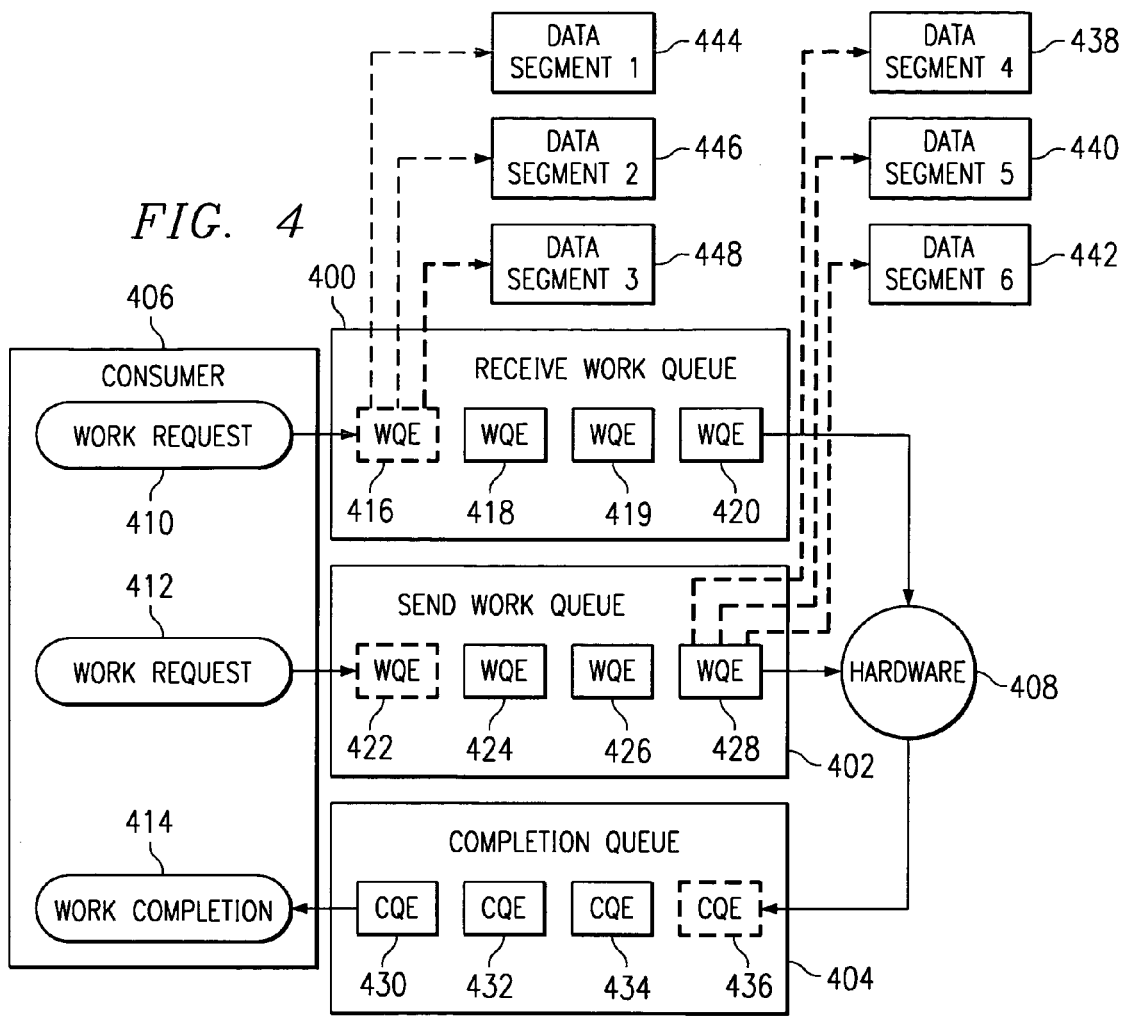
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 402 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses which have been bound to a previously registered region.

The RDMA Read work request reads a virtually contiguous memory space on a remote end node and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a network computing system implementing the present invention supports four types of transport services.

Reliable and unreliable connected services associate a local queue pair with one and only one remote queue pair. Connected services require a process to create a queue pair for each process which is to communicate with over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

Reliable datagram service associates a local end—end (EE) context with one and only one remote end—end (EE) context. The reliable datagram service permits a client process of one queue pair to communicate with any other queue pair on any other remote node. At a receive work queue, the reliable datagram service permits incoming messages from any send work queue on any other remote node. The reliable datagram service greatly improves scalability because the reliable datagram service is connectionless. Therefore, an end node with a fixed number of queue pairs can communicate with far more processes and end nodes with a reliable datagram service than with a reliable connection transport service. For example, if each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs+(N-1) EE contexts on each node for exactly the same communications.

The unreliable datagram service is connectionless. The unreliable datagram service is employed by management applications to discover and integrate new switches, routers, and end nodes into a given network computing system. The unreliable datagram service does not provide the reliability guarantees of the reliable connection service and the reliable datagram service. The unreliable datagram service accordingly operates with less state information maintained at each end node.

SAN architecture management facilities provide for a subnet manager (SM) and an infrastructure that supports a number of general management services. The management infrastructure requires a subnet management agent (SMA) in each node and defines a general service interface that allows additional general services agents.

The SAN architecture defines a common management datagram (MAD) message structure for communicating between managers and management agents. The subnet manager is an entity attached to a subnet that is responsible for configuring and managing switches, routers, and channel adapters. The subnet manager can be implemented with other devices, such as a channel adapter or a switch.

Figure 5:
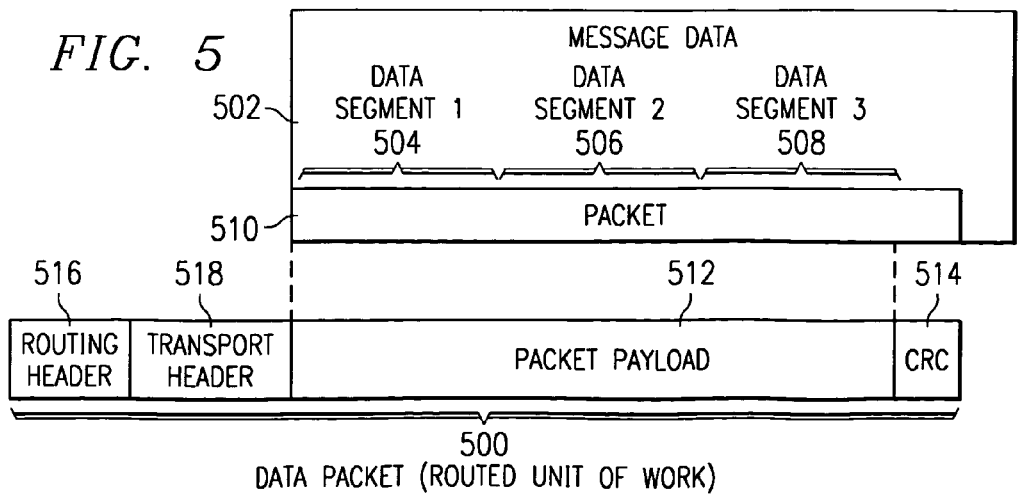
FIG. 5 is an illustration of a data packet in accordance with a preferred embodiment of the present invention.

Turning next to FIG. 5, an illustration of a data packet is depicted in accordance with a preferred embodiment of the present invention.

In data packet 500, message data 502 contains data segment 1 504, data segment 2 506, and data segment 3 508, which are similar to the data segments illustrated in FIG. 4. In this example, these data segments form a packet 510, which is placed into packet payload 512 within data packet 500. In these examples, the message segments used for subnet management contain the M_Key. The M_Key is used by the end node which is receiving the packet to determine if the subnet manager sending the packet has access to the subnet manager agent in the node. Additionally, data packet 500 contains CRC 514, which is used for error checking. Additionally, routing header 516 and transport 518 are present in data packet 500. Routing header 516 is used to identify source and destination ports for data packet 500. Transport header 518 in this example specifies the destination queue pair for data packet 500.

Additionally, transport header 518 also provides information such as the operation code, packet sequence number, and partition for data packet 500. The operating code identifies whether the packet is the first, last, intermediate, or only packet of a message. The operation code also specifies whether the operation is a send RDMA write, read, or atomic. The packet sequence number is initialized when communications is established and increments each time a queue pair creates a new packet. Ports of an end node may be configured to be members of one or more possibly overlapping sets called partitions.

SAN architecture management facilities provide for a subnet manager and an infrastructure that supports a number of general management services. The management infrastructure requires a subnet management agent in each node and defines a general service interface that allows additional general services agents. The SAN architecture includes a common management datagram (MAD) message structure for communicating between managers and management agents.

The subnet manager is an entity attached to a subnet that is responsible for configuring and managing switches, routers, and channel adapters. The subnet manager can be implemented with other devices, such as a channel adapter or a switch. The master subnet manager: (1) discovers the subnet topology; (2) configures each channel adapter port with a range of Local Identification (LID) numbers, Global Identification (GID) number, subnet prefix, and Partition Keys (P_Keys); (3) configures each switch with a LID, the subnet prefix, and with its forwarding database; and (4) maintains the end node and service databases for the subnet and thus provides a Global Unique Identification (GUID) number to LID/GID resolution service as well as a services directory.

Each node provides a subnet manager agent that the subnet manager accesses through a well known interface called the subnet management interface (SMI). Subnet manager interface allows for both LID routed packets and directed routed packets. Directed routing provides the means to communicate before switches and end nodes are configured.

SAN subnet management packets (SMPs) use an management key (M_Key) as an access control mechanism. When the subnet manager takes management control of a node, the subnet manager pushes its M_Key, along with a M_Key lease period, into each SAN component. The SAN component uses this M_Key to validate all future subnet management packets it receives within the M_Key lease period. Subsequent subnet management packets (SMPs) have their M_Key field compared with the value previously stored by subnet manager in the SAN component. If a M_Key field in a subnet management packet matches the M_Key value stored in the SAN component, the packet is accepted. Otherwise the packet is discarded.

The SAN architecture supports the notion of multiple subnet managers per subnet and specifies how multiple subnet managers negotiate for one to become the master subnet manager. Once a subnet manager gains control of a subnet, it can retain control as long as it does not lose its M_Key in the components of the subnet. Loss of the M_Key can happen under several circumstances. This loss can happen through a power cycle of the component which contains the M_Key, with the component coming up with the default M_Key when the power to the component is restored. This loss also may happen through a boot of the node which contains the subnet manager, such that the subnet manager goes away and the M_Key lease period expires in the component, in which case another subnet manager can take over control of the component.

The SAN architecture, in these examples, also supports the notion of a SM_Key. The SM_Key provides a additional level of authentication authority to control which subnet manager is allowed to be the master subnet manager. This key system also provides another level of granularity in determining which subnet managers are trusted is establishing standby subnet managers, that can backup the master subnet manager for redundancy and handoff.

The SAN network has a mechanism for partitioning the use of a shared I/O and inter-node network, providing devices that are private to nodes or shared between customer-specified nodes. A mechanism is provided in which to ignore messages from nodes which are not part of the partition. Computers or other nodes on these networks are only aware of the existence of devices they are allowed to access. This capability is partly provided by partition keys (P_Keys). The partition keys must match in the message and receiver for a packet or message between nodes to be accepted. If a packet or message is not accepted, is silently dropped. In other words, the target node acts like the target was never reached. In this fashion, a node does not become aware of nodes it should not access.

With this mechanism, however, an indication that a message was dropped is provided at some level because a mismatch of P_Keys indicates broken or malicious hardware or software is being used on the network that is sending incorrect messages either erroneously or maliciously. The present invention provides a method, apparatus, and computer implemented instructions for a capability to capture and report an unauthorized attempt to access a node in a network computing system. In these examples, the unauthorized attempt takes the form of a P_Key violation.

A mechanism is provided for capturing and reporting this unauthorized attempt using a counter, data collection, and an optional trap (interrupt). When a P_Key matching fails, the counter is incremented, the header information of the offending packet is saved, and (optionally) a trap is sent to the manager of the partitioning of the entire network. The manager can either poll for counters or saved header data, or respond to the trap (if provided). This mechanism informs the only entity on the network that must know all the entities present, the subnet manager, and which is the entity that is responsible for the partitioning settings, that something is wrong. This type of reporting mechanism and methodology is performed without requiring any cooperation from any of the other systems on the network. Such a mechanism and methodology is particularly important when open source operating systems, such as Linux, are used, since they could have been modified to do erroneous or malicious operations.

Figure 6:
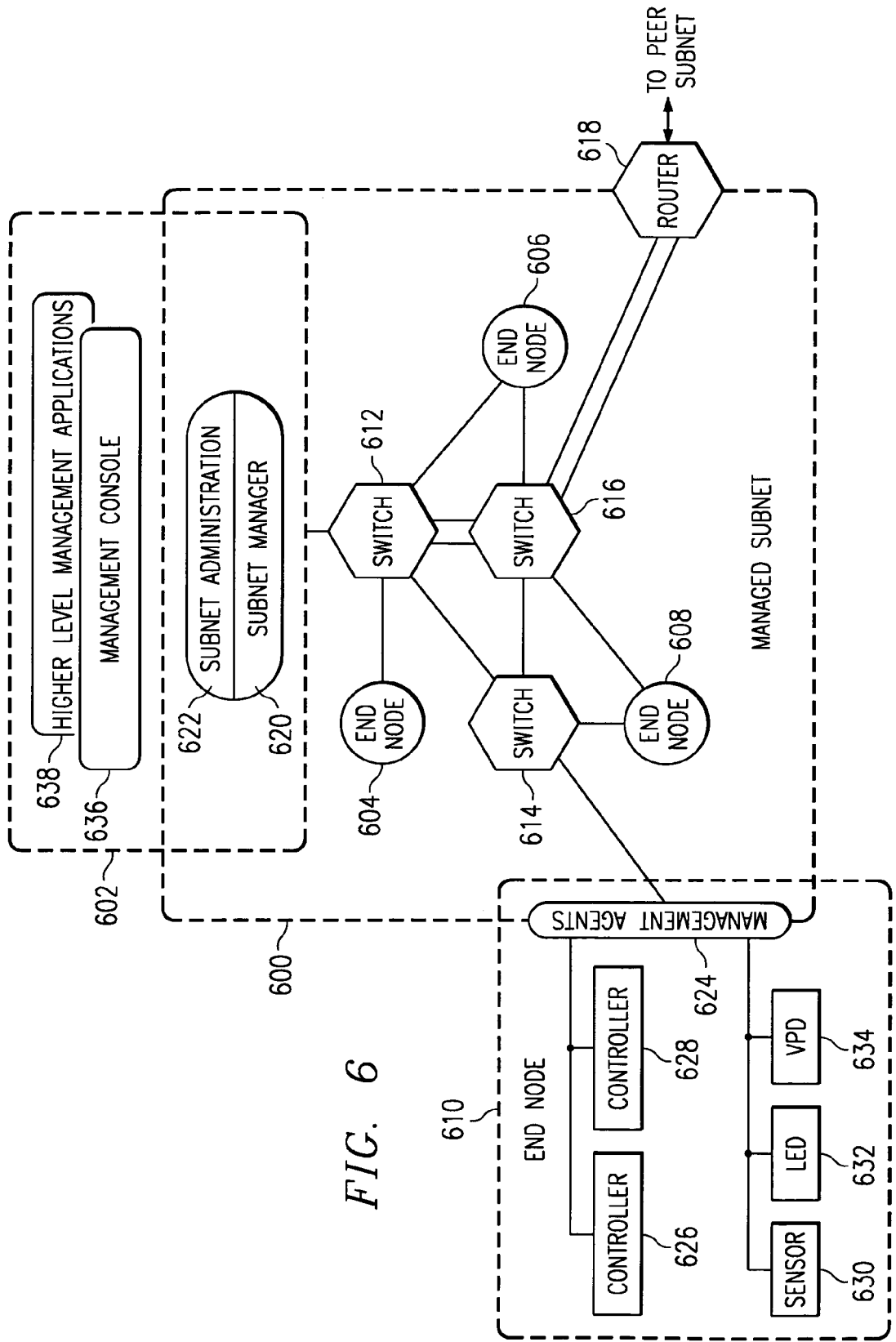
FIG. 6 is a diagram illustrating a system area network (SAN) management model in accordance with a preferred embodiment of the present invention.

Turning next to FIG. 6, a diagram illustrating a system area network (SAN) management model is depicted in accordance with a preferred embodiment of the present invention. In FIG. 6, the management of subnet 600 and SAN components like host processor node 602, end nodes 604–610, switches 612–616, and router 618 use two management services: subnet manager 620 and subnet administration 622. These two components are located in host node 602 in this example. A host node is a node containing a host channel adapter and an end node is any node which is the source for or the target of packets on the network. Switches and routers are generally not end nodes, as they mostly pass packets through from one side to the other. However, switches and routers can be end nodes relative to subnet manager packets. Subnet manager packets are used to discover, initialize, configure, and maintain SAN components through the management agent 624 in end node 610. In this example, end node 610 includes a controller 626, controller 628, sensor 630, light emitting diode (LED) 632, and vital product data (VPD) 634.

SAN subnet management packets are used by subnet manager to query and update subnet management data. Control of some aspects of the subnet management are through a user management console 636 in a host processor node 602. Additionally, higher level management applications 638 may be used in place of or in conjunction with management console 636 to manage and configure subnet 600. One of the controls provided through management console 636 is the partitioning of nodes into different partitions in which access to partitions are controlled through authorization data.

To detect an invalid attempt by a node to access another node, the SAN architecture, in these examples, uses authorization information in the form of a set of locks and keys called P_Keys. When the subnet manager configures a node, the subnet manager can set up a set of P_Keys in the node to tell the node which partitions to which the node belongs. In this manner, the node is able to identify the partitions the node can access and which partitions can have access to the node.

To implement this invention, the channel adapter (CA) implements the above P_Key Violation detection methodology along with a P_KeyViolations counter. In one embodiment, this is a 16 bit counter. The counter is set to a value of 0 at power-on-reset time. Each time the above detection methodology detects a violation, the counter is incremented by one. If the counter reaches the maximum value (all binary 1's) then the counter does not change until reset by the SM. This invention adds the P_KeyViolations counter to the CA's internal Port Information table (PortInfo), which can be read out and reset by the SM by using SMPs to access the P_KeyViolations component of the PortInfo.

The mechanism of the present invention in these examples are implemented in a channel adapter, such as host channel adapter 300 in FIG. 3. The mechanism is equally applicable to target channel adapters.

Figure 7:
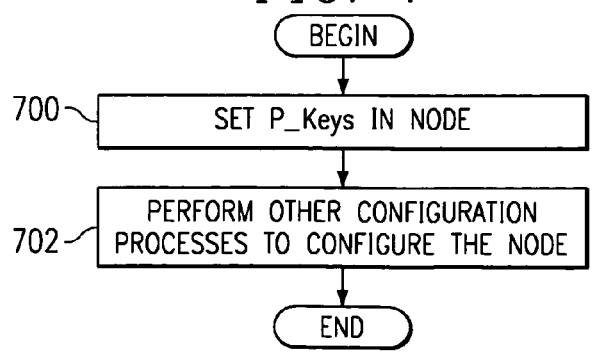
FIG. 7 is a flowchart of a process used for setting partitions in a node in accordance with a preferred embodiment of the present invention.

Turning next to FIG. 7, a flowchart of a process used for setting partitions in a node is depicted in accordance with a preferred embodiment of the present invention. The process illustrated in FIG. 7 may be implemented in a subnet manager, such as subnet manager 620 in FIG. 6 to set partitions in a subnet.

The process begins by setting P_Keys in the node (step 700). The SAN is queried and configured by means of subnet management packets (SMPs). The subnet manager using subnet management packets obtains information about the SAN components. Further, through the use of subnet management packets, the subnet manager can set configuration values in those components to configure the subnet to have the desire characteristics. Included in the management is the partitioning of the subnet into parts, giving or denying a node access to another node. In addition, a node may be a limited or full member of a partition. Partitions can be disjoint or overlapping. Next, other configuration processes are performed to configure the node (step 702) with the process terminating thereafter.

Figure 8:
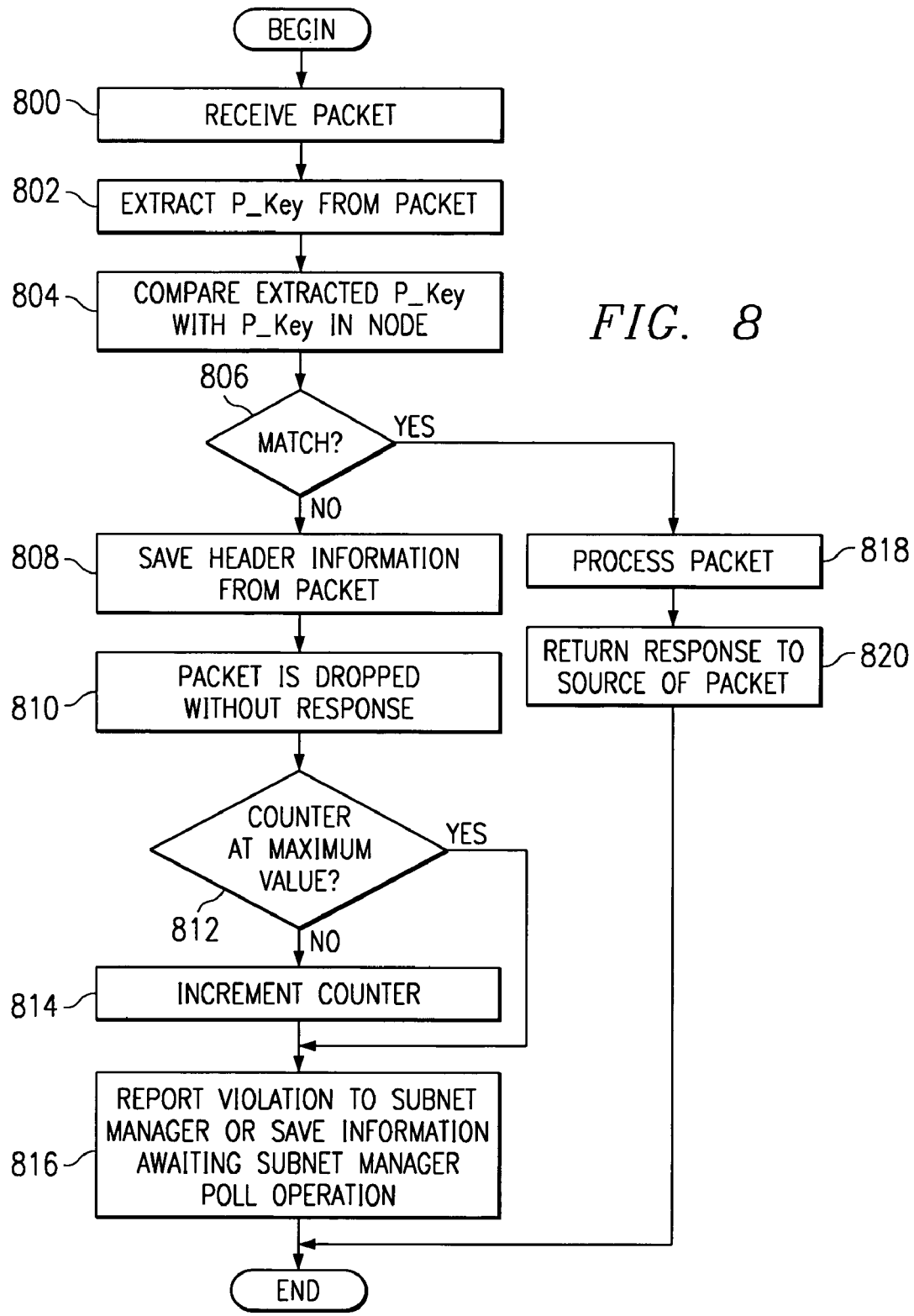
FIG. 8 is a flowchart of a process used for detecting and reporting unauthorized attempts to access a node in accordance with a preferred embodiment of the present invention.

Turning next to FIG. 8, a flowchart of a process used for detecting and reporting unauthorized attempts to access a node is depicted in accordance with a preferred embodiment of the present invention. The process illustrated in FIG. 8 may be implemented in a node within a subnet to detect and report unauthorized attempts to access the node.

The process begins by receiving a packet (step 800). the P_Key is extracted from the packet (step 802). Then, the extracted P_Key is compared with the P_Key in the node (step 804). A determination is made as to whether there is a match (step 806). In one embodiment, the P_Key is 16 bits in length with the low order 15 bits being the key and the high order bit being a membership bit. The membership bit is a 0 if the membership is limited and a 1 if the membership is full membership. In this embodiment, if the low order 15 bits are set to all zeroes, then the P_Key is considered the invalid P_Key. There is a P_Key violation on any of the following conditions: (1) the P_Key in the received network message or the P_Key in the node is the invalid P_Key; (2) the low-order 15 bits of the P_Key in the received message does not match the low-order 15 bits of the node's P_Key; and (3) the high-order bit (membership type) of the P_Key in the received message and in the node are 0 (limited membership). The location of the P_Key in the message is defined by the SAN architecture.

If there is not a match, the header information is saved from the packet (step 808) and the packet is dropped without response (step 810). In addition to reporting the violation, the node saves and makes available to the subnet manager information such as: (1) the source local identifier, which is the local identifier address of the node that is making the invalid address; (2) the destination local identifier, which is the local identifier address of the node which is trying to be accessed; (3) the P_Key value that was used in the attempt; (4) the service level of the request; and (5) the queue pair numbers involved.

If the global route header is present, the global identifier address of the source also may be saved. This information is provided to the subnet manager. With this information, the subnet manager may isolate the node or nodes that are making invalid access to a partition. Depending on the particular implementation, additional or different information may be saved from the packet.

A determination is made as to whether the counter is at the maximum value (step 812). This counter initially is set equal to zero at power on time or by subnet management packets. If the counter is not at the maximum value, then the counter is incremented (step 814). Otherwise, the increment step is bypassed. Next, a violation is reported to the subnet manager or in response to a polling of the node (step 816) with the process terminating thereafter. In the depicted examples, the reporting of the violation may occur in response to polling of the node by a subnet manager. Alternatively, the information may be sent to the subnet manager in response to other types of events.

Further, these violations may be reported through several types of subnet management packets called traps, which allow a node to asynchronously report a condition to the subnet manager. By using this trap mechanism, the node may optionally report the P_Key violation to the subnet manager for immediate action rather than waiting for subnet manager to poll for the value of the counter.

With reference again to step 806, if there is a match, the packet is processed (step 818). Then, a response is returned to the source of the packet (step 820) with the process terminating thereafter.

Although the depicted examples in FIG. 8 illustrate violations in the form of a mismatch in P_Keys, the mechanism of the present invention may be applied to access attempts using other types of authority violations such as M_Key violations. Further, a single counter is used for all unauthorized attempts in these examples. Alternatively, a counter may be used for each source of an unauthorized attempt so that counts of unauthorized attempts may be identified for each source.

Therefore, the present invention provides a method, apparatus, and computer implemented instructions for detecting and reporting unauthorized attempts to access a node. This reporting mechanism only reports attempts to a selected entity, such as a subnet manager. The source of the unauthorized attempt has no knowledge that the node is even present because the packet is dropped or discarded without a reply. Information from the packet as well as a number of unauthorized attempts may be reported to the subnet manager. This information may be analyzed on a single-event basis or over a number of such events over time to determine the nature of the attempts. For example, these attempts may be attempts at security breaches. Alternatively, the attempts may result from software problems or hardware failures.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a node for managing attempts to access the node, the method comprising:
   receiving, by the node, a packet from a source, wherein the packet includes a first key, wherein the first key is a partition key associated with a particular partition of a multi-partitioned network having a plurality of partitions, and is used such that the node receiving the packet can determine which of the partitions of the multi-partitioned network can access the node receiving the packet;
   determining, by the node, whether the packet is from a partition authorized to access the node by determining whether the first key matches a second key for the node;
   dropping, by the node, the packet without a response to the source of the packet if the first key does not match the second key;
   storing, by the node, information from the packet; and
   sending, by the node, the information to a selected recipient in response to a selected event.

2. The method of claim 1, wherein the selected event is a request from the recipient for the information.

3. The method of claim 1, wherein the selected event is an occurrence of a trap.

4. The method of claim 1, wherein the selected event is a periodic event.

5. The method of claim 1 further comprising:
   incrementing a counter source if the first key does not match the second key.

6. The method of claim 5, wherein the selected event occurs when the counter exceeds a threshold value.

7. The method of claim 1, wherein the node comprises at least one device private to the node and at least one device shared with at least one of the partitions of the multi-partition network.

8. The method of claim 1, wherein the information includes at least one of a source local identifier, a destination local identifier, the key value, a global identifier address.

9. The method of claim 7, wherein the selected recipient is a subnet manager attached to a subnet that is responsible for configuring and managing switches, routers and channel adapters of the subnet.

10. A method in a node for reporting access violations, the method comprising:
    receiving a packet from a source, wherein the packet includes authentication information, wherein the authentication information is associated with a particular partition of a multi-partioned network having a plurality of partitions, and is used such that the node that received the packet can determine which of the partitions of the multi-partitioned network can access the node that received the packet;
    verifying the received authentication information to determine if the packet is from a partition authorized to access the node;
    dropping the packet without a response to the source if the received authentication information is unverified;
    storing information from the packet; and
    sending the information to a selected recipient in response to a selected event.

11. The method of claim 10, wherein the node comprises at least one device private to the node and at least one device shared with at least one of the partitions of the multi-partition network.

12. A data processing system comprising:
    a bus system;
    a channel adapter unit connected to a system area network fabric;
    a memory connected to the bus system, wherein the memory includes as set of instructions; and
    a processing unit connected to the bus system, wherein the processing unit executes the set of instructions to receive a packet from a source, wherein the packet includes a first key, wherein the first key is a partition key associated with a particular partition of a multi-partitioned network having a plurality of partitions, and is used such that the data processing system can determine which of the partitions of the multi-partitioned network can access the data processing system; determine whether the first key mates a second key for the data processing system; drop the packet without a response to the source if the first key does not match the second key; store information from the packet; and send the information to a selected recipient in response to a selected event.

13. A node comprising:
receiving means for receiving a packet from a source, wherein the packet includes a first key, wherein the first key is a partition key associated with a particular partition of a multi-partitioned network having a plurality of partitions, and is used such that the node can determine which of the partitions of the multi-partitioned network can access the network node;
determining means for determining whether the packet is from a partition authorized to access the node by determining whether the first key matches a second key for the node;
dropping means for dropping the packet without a response to the source if the first key does not match the second key;
storing means for storing information from the packet; and
sending means for sending the information to a selected recipient in response to a selected event.

14. The node of claim 13, wherein the selected event is a request from the recipient for the information.

15. The node of claim 13, wherein the selected event is an occurrence of a trap.

16. The node of claim 13, wherein the selected event is a periodic event.

17. The node of claim 13 comprising:
incrementing means for incrementing a counter source if the first key does not match the second key.

18. The node of claim 17, wherein the selected event occurs when the counter source exceeds a threshold value.

19. The node of claim 13, wherein the node comprises at least one device private to the node and at least one device shared with at least one of the partitions of the multi-partition network.

20. The node of claim 13, wherein the information includes at least one of a source local identifier, a destination local identifier, the key value, a global identifier address.

21. The node of claim 19, wherein the selected recipient is a subnet manager attached to a subnet that is responsible for configuring and managing switches, routers and channel adapters of the subnet.

22. A node comprising:
receiving means for receiving a packet from a source, wherein the packet includes authentication information, wherein the authentication information is associated with a particular partition of a multi-partitioned network having a plurality of partitions, and is used such that the node can determine which of the partitions of the multi-partitioned network can access the node;
verifying means for verifying the received authentication information to determine if the packet is from a partition authorized to access the node;
dropping means for dropping the packet without a response to the source if the received authentication information is unverified;
storing means for storing information from the packet; and
sending means for sending the information to a selected recipient in response to a selected event.

23. The node of claim 22, wherein the node comprises at least one device private to the node and at least one device shared with at least one of the partitions of the multi-partition network.

24. A computer program product in a computer readable medium for use in a node for managing attempts to access the node, the computer program product comprising:
first instructions for receiving a packet from a source, wherein the packet includes a first key, wherein the first key is a partition key associated with a particular partition of a multi-partitioned network having a plurality of partitions, and is used such that the node can determine which of the partitions of the multi-partitioned network can access the network node;
second instructions for determining whether the packet is from a partition at authorized to access the node by determining whether the first key matches a second key for the node;
third instructions for dropping the packet without a response to the source if the first key does not match the second key;
fourth instructions for storing information from the packet; and
fifth instructions for sending the information to a selected recipient in response to a selected event.

25. A computer program product in a computer readable medium for use in a node for reporting access violations, the computer program product comprising:
first instructions for receiving a packet from a source, wherein the packet includes authentication information, wherein the authentication information is associated with a particular partition of a multi-partitioned network having a plurality of partitions, and is used such that the node can determine which of the partitions of the multi-partitioned network can access the node;
second instructions for verify the received authentication information to determine if the packet is from a partition authorized to access the node;
third instructions for dropping the packet without a response to the source if the received authentication information is unverified;
fourth instructions for storing information from the packet; and
fifth instructions for sending the information to a selected recipient in response to a selected event.

* * * * *